United States Patent [19]
O'Connor
[11] Patent Number: 4,751,731
[45] Date of Patent: Jun. 14, 1988

[54] TELEPHONE HANDSET DISINFECTING AND/OR DEODORIZING DEVICE

[76] Inventor: Desmond O'Connor, 4930 Sugar Mill Rd., Dallas, Tex. 75234

[21] Appl. No.: 6,330
[22] Filed: Jan. 14, 1987

Related U.S. Application Data

[63] Continuation of Ser. No. 703,446, Feb. 19, 1985, abandoned, which is a continuation of Ser. No. 494,375, May 13, 1983, abandoned.

[51] Int. Cl.[4] .......... H04R 1/12; H04M 1/17
[52] U.S. Cl. .......... 379/439; 379/452
[58] Field of Search .......... 379/439, 437, 451, 452

[56] References Cited

U.S. PATENT DOCUMENTS

| | | | |
|---|---|---|---|
| 965,257 | 7/1910 | Waldron et al. | 379/452 |
| 1,047,121 | 12/1912 | Bennett | 379/452 |
| 1,140,048 | 5/1915 | Loeber | 379/452 |
| 1,147,312 | 7/1915 | Daniel | 379/452 |
| 1,369,630 | 2/1921 | Dempster | 379/439 |
| 1,472,530 | 10/1923 | McComas | 379/452 |
| 1,610,659 | 12/1926 | Craig | 379/452 |
| 2,045,658 | 6/1936 | Kaufmann | 379/452 |
| 2,188,958 | 2/1940 | Richardson et al. | 379/436 |
| 2,286,900 | 6/1942 | Danley et al. | 379/439 |
| 2,507,375 | 5/1950 | Hartwell et al. | 379/452 |
| 2,650,269 | 8/1953 | Webb | 379/452 |
| 3,530,261 | 9/1970 | Guim | 379/452 |
| 3,962,555 | 6/1976 | Efair | 379/452 |
| 4,329,548 | 5/1982 | Strassburg | 379/452 |
| 4,392,028 | 6/1983 | Saxton | 379/146 |
| 4,465,907 | 8/1984 | Minear et al. | 381/81 |

FOREIGN PATENT DOCUMENTS

| | | | |
|---|---|---|---|
| 2528676 | 1/1977 | Fed. Rep. of Germany | 379/452 |
| 2618062 | 11/1977 | Fed. Rep. of Germany | 379/452 |
| 773081 | 11/1934 | France | 379/452 |
| 2266410 | 11/1975 | France | 179/185 |
| 197806 | 9/1978 | France | 179/185 |
| 56706 | 5/1911 | Switzerland | 179/185 |
| 31801 | 11/1911 | Switzerland | 379/439 |
| 221794 | 2/1925 | United Kingdom | 379/452 |
| 291237 | 5/1928 | United Kingdom | 379/452 |
| 425595 | 2/1934 | United Kingdom | 179/185 |
| 458852 | 9/1935 | United Kingdom | 179/185 |
| 832145 | 4/1960 | United Kingdom | 379/452 |
| 999682 | 7/1965 | United Kingdom | 179/185 |
| 1011468 | 12/1965 | United Kingdom | 179/185 |
| 1370757 | 10/1974 | United Kingdom | 379/452 |
| 2031246 | 4/1980 | United Kingdom | 379/439 |

*Primary Examiner*—Jin F. Ng
*Assistant Examiner*—Danita R. Byrd
*Attorney, Agent, or Firm*—Stanley R. Moore

[57] ABSTRACT

A device for disinfecting and protecting a part of a telephone handset including a substrate of general shape corresponding to the telephone part, a layer of adhesive on one side of the substrate to receive a disinfectant carrying pad and to enable the substrate to be attached to the telephone part, and a pad for carrying a disinfectant affixed to the substrate by the adhesive layer or other means to contact the telephone part when the substrate is attached to the telephone part.

3 Claims, 1 Drawing Sheet

TELEPHONE HANDSET DISINFECTING AND/OR DEODORIZING DEVICE

This is a continuation of application Ser. No. 703,446, filed Feb. 19, 1985, which is a continuation of application Ser. No. 494,375, filed May 13, 1983, both now abandoned.

BACKGROUND OF THE INVENTION

1. Field of the Invention

This invention relates to improvements in disinfecting devices, and, more particularly, to disinfecting devices of the type which can be applied to disinfect and/or deodorize parts of a telephone handset.

2. Description of the Prior Art

In hotels, motels, hospitals and other places of public convenience, often times for the comfort of the guests or patrons steps are taken to provide clean and sanitary conditions. One area which has been overlooked in the past is that of the telephone usually provided in such locations. Some hotels attempt to sanitize the telephone handset by applying an aerosol disinfectant to the speaker and earphone parts of the handset. This, however, is undesirable in that it may introduce residue building fluids into the handset. Also, after such aerosol sprays have been applied, no trace or evidence remains on the handset to comfort or assure a subsequent user that the handset has been sterilized or disinfected.

Various disinfecting attachment devices have been proposed, such as those exemplified in U.S. Pat. Nos. 823,494; 1,400,334; 1,386,975; 2,507,375 and 1,367,267. The devices shown in those patents, however, are intended to be in place during operation of the telephone, and which may not only interfere with the ease of use of modern day handsets, but may affect the audio fidelity, as well.

More recent sanitary covers are shown in U.S. Pat. Nos. 3,169,171; 2,450,703 and 2,938,967. All of these embodiments are intended for operation during use, and require the user to himself carry a supply of the devices and apply the device himself to the handset.

A permanently attachable or reusable sanitary device is shown in U.S. Pat. No. 2,650,269 in which a supply of individually disposable sanitary pads is carried in a dispenser apparatus, and after use, the user can dispose of the topmost one of the pads to ready the telephone for the next user.

SUMMARY OF THE INVENTION

In view of the above, it is an object of the invention to provide a device for disinfecting and protecting telephone handset parts.

It is another object of the invention to provide a device of the type described which is relatively easy to manufacture and use.

It is yet another object of the invention to provide a device of the type described which is removably attachable to the telephone handset to provide an indication of the sanitized state of the handset to a user.

These and other objects, features, and advantages will become apparent to those skilled in the art from the following detailed description when read in conjunction with the accompanied drawings and appended claims.

In a broad aspect of the invention, a device for sanitizing a part of a telephone handset is provided. The device includes a substrate of general shape corresponding to the telephone part and a layer of adhesive on one side of the substrate to receive a sanitizing material carrying pad and to enable the substrate to be attached to the telephone part. A pad for carrying a sanitizing material is affixed to said substrate by said adhesive layer or other means to contact said telephone part when said substrate is attached to said telephone part. In another embodiment of the invention, the device further includes a second substrate, adhesive layer, and pad to enable attachment of the device to both a speaker and a receiver portion of a telephone handset.

BRIEF DESCRIPTION OF THE DRAWINGS

The invention is illustrated in the accompanying drawings in which.

DETAILED DESCRIPTION OF THE PREFERRED EMBODIMENTS

Figure 1:
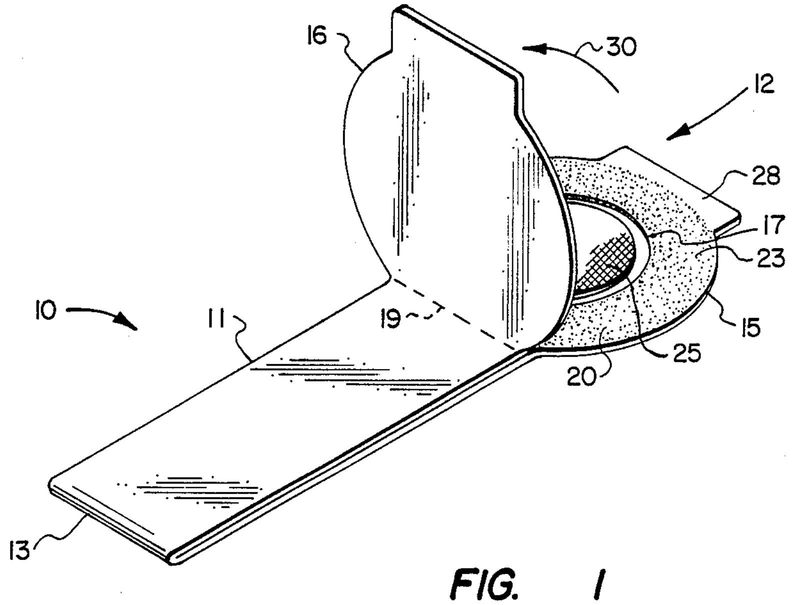
FIG. 1 is a perspective view of a device for disinfecting and protecting a part of a telephone handset, in accordance with the principles of the invention.

A device 10 for use in sanitizing a telephone handset is shown in FIG. 1. (It will be understood herein that the word "sanitizing" is used to denote protecting, disinfecting, or deodorizing or a combination of any of these steps or conditions.) The device 10 includes a handle portion 11 and a sanitizing material carrying adherent portion 12. The device 10 may be formed on a substrate of paper, plastic, or plastic or metallic coated paper, or other relatively flexible material for ease in handling and usage. In the embodiment shown in FIG. 1, the substrate 11 is formed of a dumbbell-shaped piece of paper (circular shaped ends with straight interconnecting member) having a portion 13 at which the paper is folded to bring circular shaped end portions 15 and 16 into juxtaposition. The circular portion 16 is detachable from the device 10 along serrations 19 to allow the top surface 20 of the circular portion 15 to be exposed. The top surface 20 includes a layer of an adhesive material 23 (shown in the drawing by stiples) together with a sanitizing material carrying pad 25. The sanitizing material carrying pad 25 can conveniently be of gauze, felt, or any other suitable material which can carry a fluid or powder disinfectant, or deodorizer, if desired.

If desired, as shown, an additional tab member 28 can be provided on the circular portion 15 to facilitate its removal from the telephone handset, after use, as will become apparent.

The top portion 16 of the device 10 in its storage position (not shown) is sealed to the bottom portion 15 adjacent the sanitizing material carrying pad 25, in the area 17. This seal formed at the area 17 isolates the moisture (if any) in the sanitizing material carrying pad 25 from deleteriously affecting the adjacent adhesive material 23. The seal can be achieved by pressure, heat, glue or other appropriate means depending upon the materials used in the fabrication of the substrate 11. If, for instance, the substrate were to be of plastic coated paper, the vapor containing seal could be achieved by heat and pressure between the top and bottom circular portions 15 and 16.

If desired, a similar seal (not shown) can be provided between the outside circumference of the circular members 15 and 16 to further isolate the adhesive material 23 from moisture in the surrounding environment.

In operation, the upper circular portion 16 is swung from its storage position (not shown) adjacent the sanitizing material carrying pad 25 and adhesive layer 23 up and away from the adhesive/disinfectant portion of the device, as shown by the arrow 30. The circular portion 16 may then be torn or detached from the device 10 along the perforations 19 on the stem or handle 11. The circular portion 15 is then attached, for example, to the microphone or transmitter portion of the telephone handset (or receiver, as desired) by merely placing the circular portion 15 over the selected portion of the handset and pressing the adhesive layer 23 into contact therewith. This positioning brings the pad 25 into contact with the telephone handset, releasing the sanitizing disinfectant or deodorizer into and onto the telephone to thereby sanitize it.

It can be seen that the device 10 is intended to remain in fastened or attached position on the handset to continuously sanitize the handset and also to provide assurance to the next subsequent user that the handset has been properly sanitized. If desired, an assuring label (not shown) may be printed on the substrate on the front and/or back sides of the handle 11.

The next subsequent user may then confidently grasp the handle 11, or the tab portion 28 and merely remove the device 10 from the handset, discard the inexpensive device 10, and use the handset in usual fashion.

Figure 2:
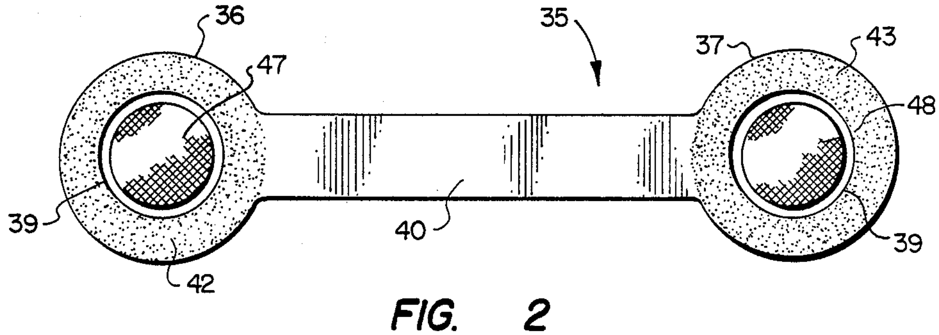
FIG. 2 is a plan view of an alternative preferred embodiment of a device for disinfecting and protecting both speaker and transmitter portions of a telephone handset, in accordance with the invention.

An alternative preferred embodiment of the invention is shown in FIG. 2, which depicts a dumbbell-shaped member 35 having generally circular shaped end portions 36 and 37 separated by an elongated handle or the like 40. Each of the end portions 36 and 37 has a layer of adhesive material 42 and 43, respectively, formed thereon as well as a sanitizing material carrying pads 46 and 47, respectively. A protective layer (not shown) overlies at least the circular portions 36 and 37 of the device 35, and in its storage configuration are sealed thereto at areas 38 and 39, and, if desired, around the outside circumferences of the circular portions 36 and 37 to protect the adhesive materials 42 and 43 from vapor or moisture in the sanitizing material carrying pads 47 and 48 and the surrounding environment. The device 35 is dimensioned such that the distance between the circular portions 36 and 37 defined by innerconnecting member 40 is approximately that of the separating distance of the speaker or receiver and transmitter or microphone portions of a standard telephone handset. Thus, in the operation of the device 35 shown in FIG. 2, the protective layers (not shown) of the adhesive portions 42 and 43 of the end circular portions 36 and 37 are removed in a fashion similar to preparing an adhesive bandage, and each is pressed into contact with the respective transmitter and receiver portions of the telephone handset with which the device is used. Again, the pressing action brings the pads 47 and 48 into contact with the telephone handset to enable the disinfectant and/or deodorizer within the pads 46 and 47 to contact the telephone handset.

Figure 3:
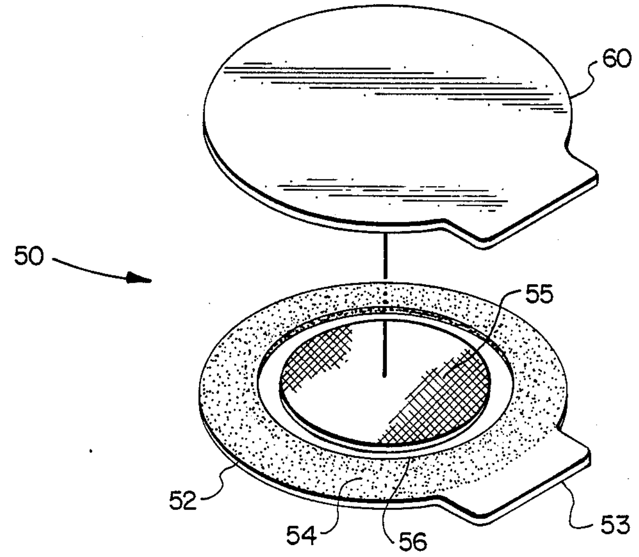
FIG. 3 is a perspective view of another alternative preferred embodiment of a device for protecting and disinfecting a part of a telephone handset, in accordance with the invention.

Still another version of the disinfecting and protecting device 50 is shown in FIG. 3. The device of FIG. 3 represents a particularly preferred embodiment of the invention, since it is easily storable and handleable, and can be fabricated with minimum cost as will become apparent. In the embodiment shown in FIG. 3, a circular substrate 52 is provided having a tab or other extension 53 extending from one edge thereof to facilitate the handling and removal and installation of the device 50. A layer 54 of adhesive or similar material is provided on one face of the substrate 52, and, a pad 55 of adhesive and/or deodorizing carrying material is then placed on the adhesive layer 54. A protective layer 60 having a shape generally corresponding to the shape of the substrate 52 is provided which ordinarily covers the adhesive layer 54 of the substrate 52 as well as the disinfectant carrying pad 55 to protect both from the elements to which the device may be exposed prior to its installation. The protective layer 60 is sealed to the substrate 52 along area 56, and, if desired, around the outside circumference of the substrate 52, in a similar fashion as described above with respect to the embodiments of FIGS. 1 and 2. For use in installation, the cover 60 which may be of plastic, paper or flexible material can be peeled or removed from the substrate 52 and the device 50 then placed and adhered onto a desired portion of the telephone handset, in the fashion described above with respect to the embodiments of FIG. 1 and FIG. 2.

Although the invention has been described and illustrated with a certain degree of particularity, it is understood that the present disclosure has been made by way of example only and that numerous changes in the combination and arrangement of parts may be resorted to without departing from the spirit and scope of the invention as hereinafter claimed.

I claim:

1. A device for sanitizing the transmitter or receiver portion of a telephone handset, said device comprising:

a planar substrate having a peripheral shape corresponding generally to the telephone handset portion to be sanitized and protected;

a sanitizing substance carrying pad attached to a central portion of a handset engaging surface of the substrate, the pad having a size less than the handset engaging surface of the substrate such that a peripheral portion of the substrate is disposed about the pad;

a layer of adhesive material attached to the peripheral portion of the substrate so as to substantially surround the pad;

a protective cover having a peripheral shape corresponding to said substrate and being removably affixed to the handset engaging surface thereof to protect said adhesive layer and said sanitizing substance carrying pad prior to removal of said protective cover and adherence of the adhesive material around the periphery of said surface to the handset portion thereby bringing said sanitizing substance carrying pad into engagement with said handset portion to sanitize it; and seal means formed between the handset portion engaging surface of said substrate and said protective cover surrounding said sanitizing substance carrying pad for preventing moisture in said sanitizing substance carrying pad from deleteriously affecting said adhesive material.

2. The device of claim 1 wherein said substrate and said protective cover are formed from a common sheet of flexible material comprising an elongate strip having correspondingly shaped opposed ends and a narrow connecting portion, said connecting portion being folded along a transverse line to bring one of said ends into overlying facing relationship with the other of said ends with the facing surface of one end having said adhesive layer and pad thereon to form said substrate and the other facing surface forming said protective cover therefor.

3. The device of claim 2 wherein said relatively flexible material is selected from the group consisting of paper, plastic, plastic coated paper and metallic coated paper.

* * * * *